United States Patent
Sarwar et al.

(10) Patent No.: US 9,054,985 B2
(45) Date of Patent: Jun. 9, 2015

(54) SYSTEM AND METHOD FOR DYNAMIC RATE LIMITING AND SHAPING OF TRAFFIC BASED ON AVAILABLE BANDWIDTH

(75) Inventors: Muhammad Sakhi Sarwar, Brookfield, CT (US); Zigmunds Andis Putnins, Ridgewood, NY (US); Jaya Sarup, Monroe, NY (US); Zanjun Lu, Edison, NJ (US); Nitin Gogate, Montvale, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 761 days.

(21) Appl. No.: 13/169,937

(22) Filed: Jun. 27, 2011

(65) Prior Publication Data

US 2012/0327768 A1 Dec. 27, 2012

(51) Int. Cl.
*H04L 12/851* (2013.01)
*H04L 12/815* (2013.01)

(52) U.S. Cl.
CPC ............ *H04L 47/2408* (2013.01); *H04L 47/22* (2013.01)

(58) Field of Classification Search
None
See application file for complete search history.

(56) References Cited

U.S. PATENT DOCUMENTS

2007/0091791 A1* 4/2007 Green ........................ 370/222
2008/0150641 A1 6/2008 Costa et al. ................. 331/16

FOREIGN PATENT DOCUMENTS

EP 2037636 A1 * 3/2009 .............. H04L 12/56

* cited by examiner

*Primary Examiner* — Jackie Zuniga Abad
(74) *Attorney, Agent, or Firm* — Baker Botts L.L.P.

(57) ABSTRACT

A method may include monitoring available aggregate bandwidth of a network element and determining if the available aggregate bandwidth is sufficient to communicate traffic at a rate equal to an aggregate sum of committed information rates for a plurality of classes of traffic. If the available aggregate bandwidth is sufficient to communicate traffic at the rate equal to the aggregate sum of committed information rates for a plurality of classes of traffic, traffic may be communicated for each of the plurality of classes in accordance with the respective committed information rate for each class. Otherwise, traffic may be communicated for each of the plurality of classes in an amount proportional to the respective committed information rate for a particular class and the available aggregate bandwidth.

13 Claims, 3 Drawing Sheets

SYSTEM AND METHOD FOR DYNAMIC RATE LIMITING AND SHAPING OF TRAFFIC BASED ON AVAILABLE BANDWIDTH

TECHNICAL FIELD OF THE INVENTION

The present invention relates generally to networking and computing systems and, more particularly, to a method and system for dynamic rate limiting and shaping of traffic based on available bandwidth.

BACKGROUND

Telecommunications system, cable televisions systems, and data communication networks use communication networks to rapidly convey large amounts of information between remote points. A communication network may include network elements that route packets through the network. Some network elements may include a distributed architecture, wherein packet processing may be distributed among several subsystems of the network element (e.g., line cards).

Providers of communications networks and their customers often agree to certain quality of service metrics for transmission of data throughout a communication network. For example, providers and customers may agree to a committed information rate (CIR), which may be an average bandwidth for a virtual circuit guaranteed by a provider under normal conditions. In some instances, providers and their customers may agree to various levels or classes of service, in which some classes may have a higher CIR and higher priority than others.

Due to an occurrence of a link failure in a communication network, resulting bandwidth may be reduced to a level insufficient to support CIR for all classes. In some instances, higher-class traffic may consume all or most of the remaining bandwidth, essentially starving all lower-class traffic.

SUMMARY

In accordance with the present invention, disadvantages and problems associated with shaping traffic in the event of a link failure may be reduced or eliminated.

In accordance with embodiments of the present disclosure, a method may include monitoring available aggregate bandwidth of physical ports of a network element and determining if the available aggregate bandwidth is sufficient to communicate traffic at a rate equal to an aggregate sum of committed information rates for a plurality of classes of traffic. In response to a determination that the available aggregate bandwidth is sufficient to communicate traffic at the rate equal to the aggregate sum of committed information rates for a plurality of classes of traffic, traffic may be communicated for each of the plurality of classes in accordance with the respective committed information rate for each class. In response to a determination that the available aggregate bandwidth is insufficient to communicate traffic at the rate equal to the aggregate sum of committed information rates for a plurality of classes of traffic, traffic may be communicated for each of the plurality of classes in an amount proportional to the respective committed information rate for a particular class and the available aggregate bandwidth.

Certain embodiments of the invention may provide one or more technical advantages. For example, methods and systems disclosed herein may allow for continued communication of traffic at numerous classes of traffic in the event of a reduction in bandwidth.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
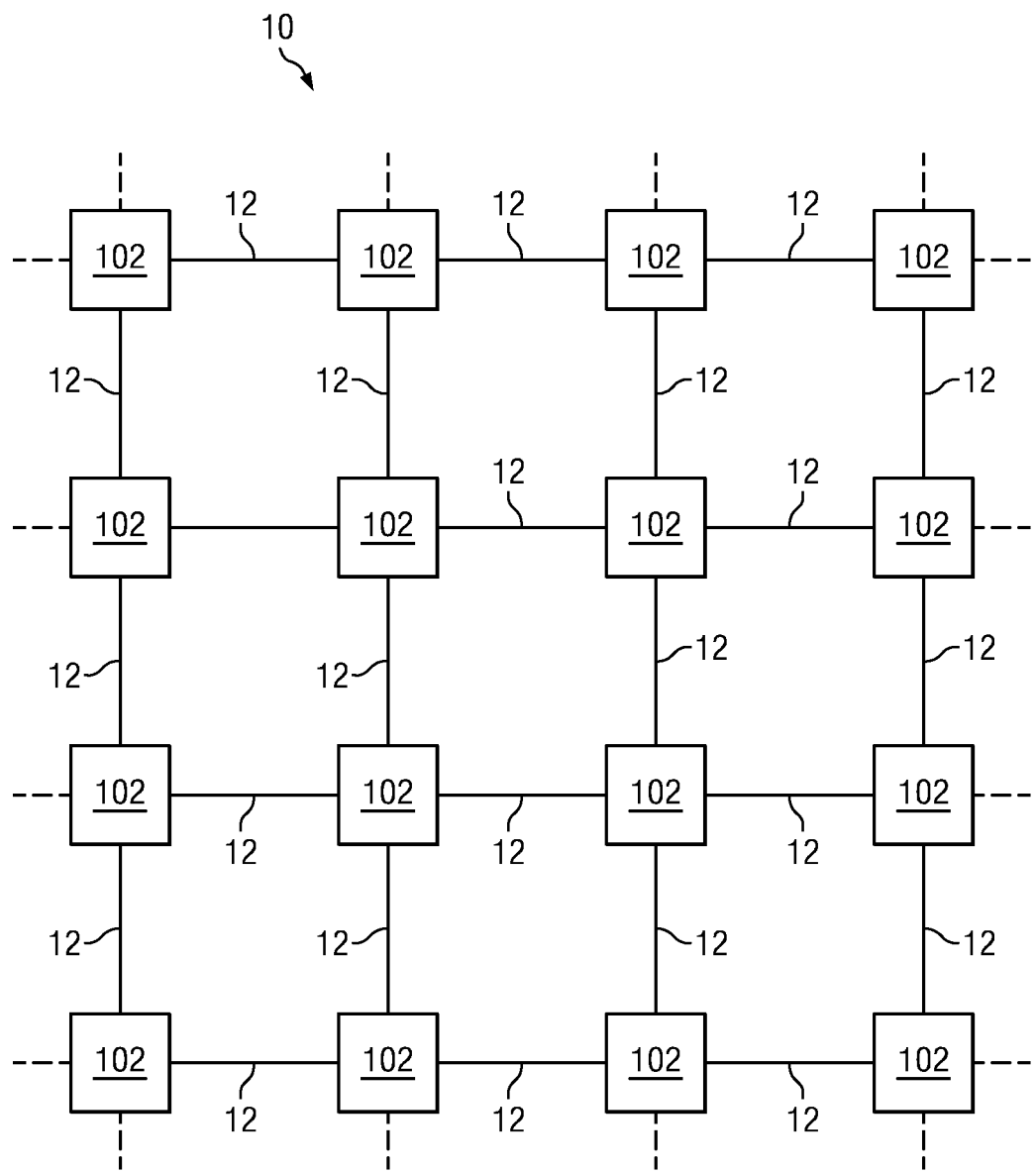
FIG. 1 illustrates a block diagram of an example network, in accordance with embodiments of the present disclosure.
Figure 2:
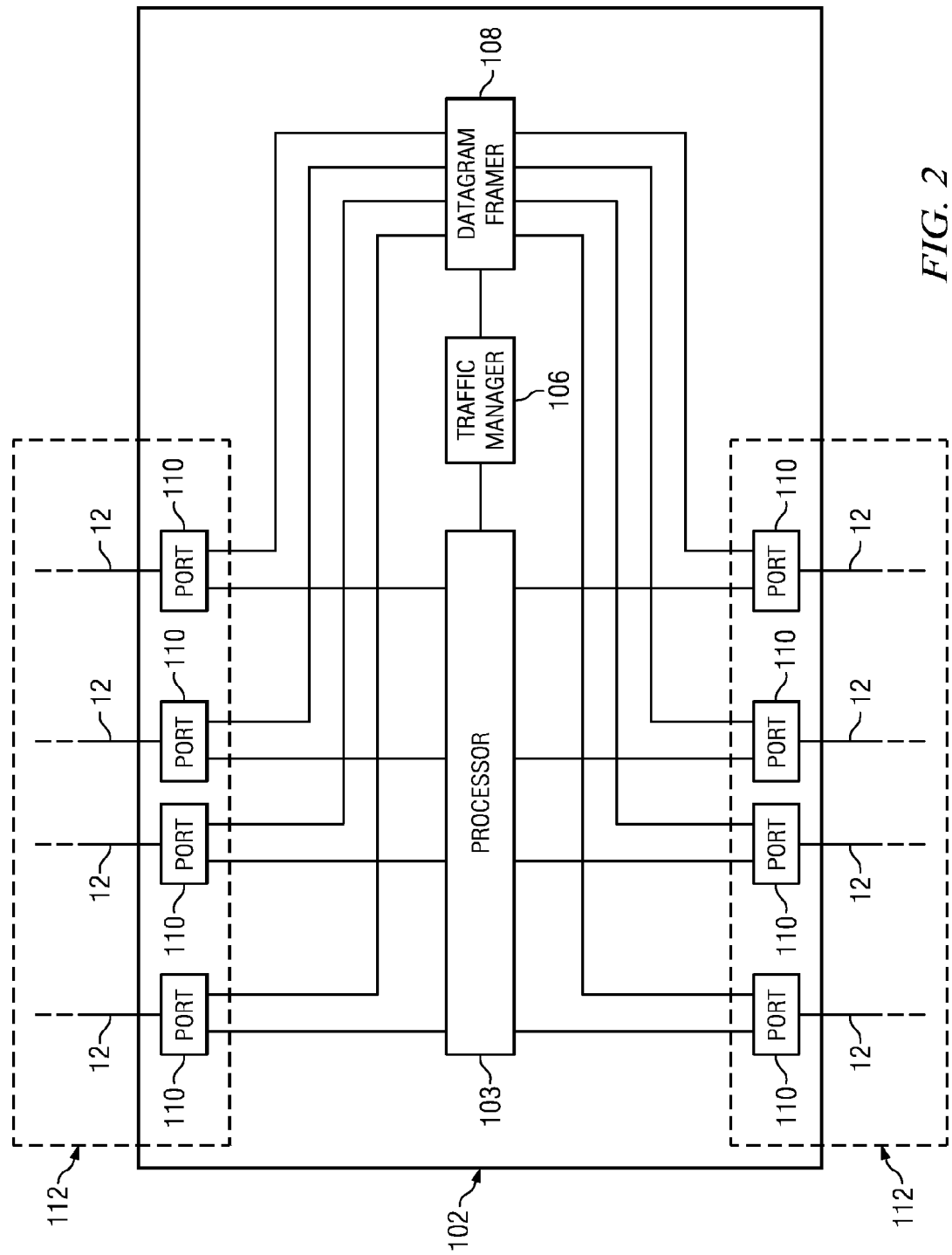
FIG. 2 illustrates a block diagram an example network element, in accordance with embodiments of the present disclosure.
Figure 3:
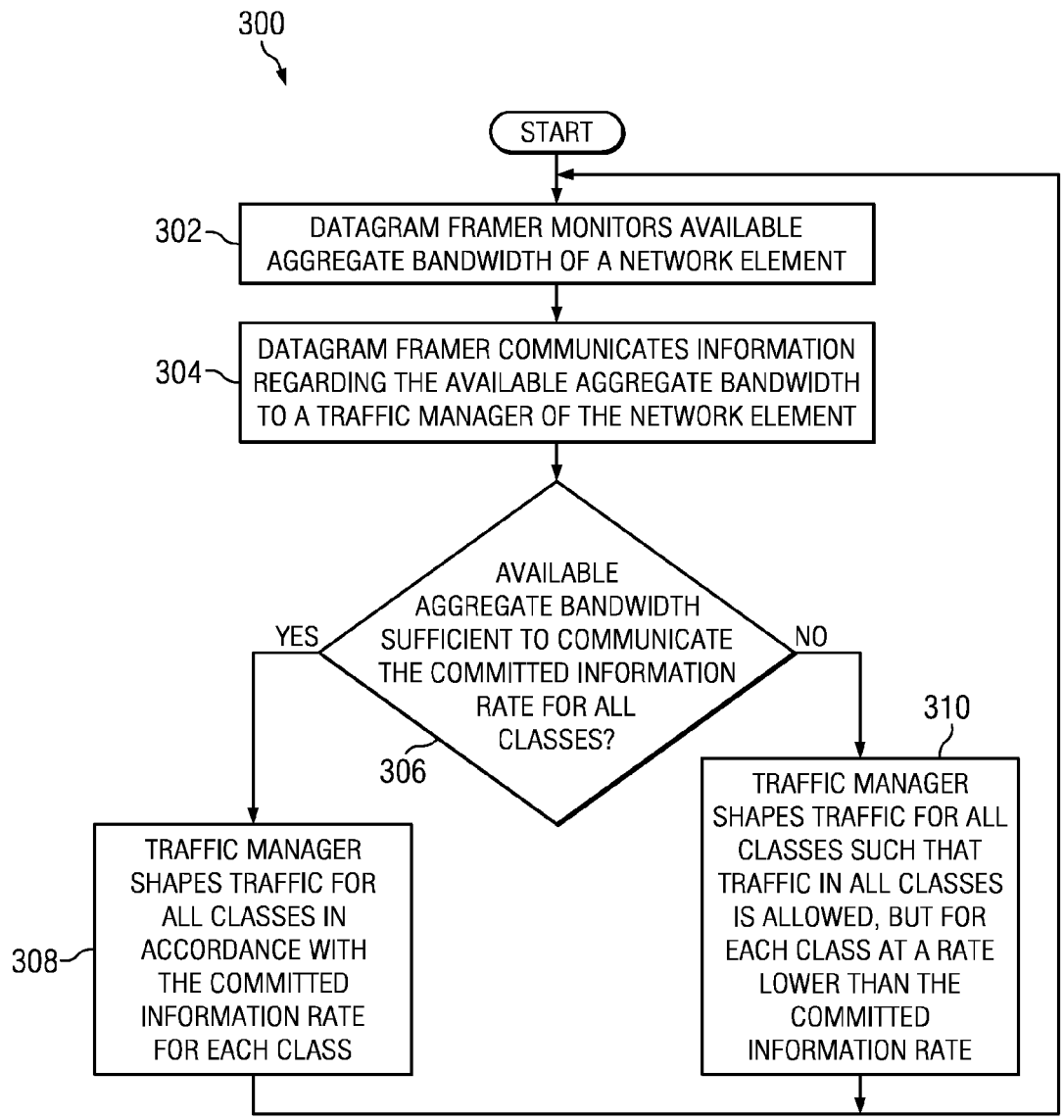
FIG. 3 illustrates a flow chart for an example method for dynamic rate limiting and shaping based on variable bandwidth, in accordance with embodiments of the present disclosure.

Embodiments of the present invention and its advantages are best understood by referring to FIGS. 1-3, like numerals being used for like and corresponding parts of the various drawings.

FIG. 1 illustrates a block diagram of an example network 10, in accordance with certain embodiments of the present disclosure. In certain embodiments, network 10 may be an Ethernet network. In these and other embodiments, network 10 may be an optical network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes to create a mesh. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, copper cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. As used herein, the term "datagram" will be used to generally refer to any data structure used to convey traffic, including without limitation a packet, a frame, an unstructured bit stream, or any other suitable data structure.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

FIG. 2 illustrates a block diagram an example network element 102, in accordance with certain embodiments of the present disclosure. As discussed above, each network element 102 may be coupled to one or more other network elements 102 via one or more transmission media 12. In some embodiments, however, not all network elements 102 may be directly coupled as shown in FIG. 2. Each network element 102 may generally be configured to receive data from and/or transmit data to one or more other network elements 102. In certain embodiments, network element 102 may comprise a switch or router configured to transmit data received by network element 102 to another device (e.g., another network element 102) coupled to network element 102.

As depicted in FIG. 2, network element 102 may include a processor 103, a traffic manager 106, a datagram framer 108, and one or more ports 110 communicatively coupled to switching element 104.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data. In particular, processor 103 may be configured to execute various functions associated with routing, switching, and/or other traffic and datagram processing functions (e.g., pattern matching, key lookup, computation, data bitfield manipulation, queue management, control processing, allocation and recirculation of datagram buffers, etc.).

A traffic manager 106 may be communicatively coupled to processor 103, and may include any suitable system, apparatus, or device configured to police and/or shape flows of traffic. Traffic shaping is the control of traffic flows in order to optimize or guarantee performance, improve latency, and/or increase usable bandwidth by delaying packets of traffic that meet certain criteria. More specifically, traffic shaping is any action on a flow of packets which imposes additional delay on packets such that they conform to some predetermined constraint (e.g., a service-level agreement or traffic profile). Traffic policing is the process of monitoring network traffic for compliance with a service-level agreement and taking action to enforce such agreement. For example, in traffic policing, traffic exceeding a service-level agreement may be discarded immediately, marked as non-compliant, or left as-is, depending on an administrative policy and the characteristics of the excess traffic. Additionally, in accordance with embodiments of the present disclosure, and as described in greater detail below, traffic manager 106 may receive bandwidth information from datagram framer 108 or another component of network element 102 and, based on such bandwidth information, dynamically shape traffic in the event of a bandwidth reduction in order to prevent starvation of lower-class traffic.

Datagram framer 108 may be communicatively coupled to traffic manager 106 and may comprise any system, device, or apparatus configured to format traffic datagrams received from traffic manager 106 for communication via ports 110 to other network elements 102. In some embodiments, datagram framer may be implemented in whole or part by a synchronous optical networking (SONET) framer. In addition, datagram framer 108 may be configured to determine any increase or decrease in bandwidth of outgoing links (e.g., on account of addition, failure, and/or removal of ports 110, transmission media 12, or other components coupling a network element 102 to other network elements 102). For example, in some embodiments, datagram framer 108 may be configured to perform Link Capacity Adjustment Scheme (LCAS) in accordance with International Telecommunication Union Standardization Sector (ITU-T) standard G.7042. In such embodiments, datagram framer may manage one or more LCAS groups 112 as depicted in FIG. 2. Accordingly, datagram framer 108 may be aware at all times of the aggregate bandwidth capabilities of its ports 110 as new links become available and other links become unavailable.

Each port 110 may be communicatively coupled to datagram framer 108 (for egress traffic) and processor 103 (for ingress traffic) and may include any suitable system, apparatus, or device configured to serve as an interface between a network element 102 and a transmission medium 12. Each port 110 may enable its associated network element 102 to communicate to other network elements 102 using any suitable transmission protocol and/or standard. A port 110 and its various components may be implemented using hardware, software, or any combination thereof. For example, in certain embodiments, one or more ports 110 may include or be part of a network interface card. In the same or alternative embodiments, one or more ports 110 may include or be part of a line card. For example, a port 110 may comprise an Ethernet port, an optical port, or any other suitable port.

In operation, datagram framer 108 may monitor available aggregate bandwidth for its physical ports 110 and communicate such bandwidth information to traffic manager 106. Based on the bandwidth information, traffic manager 106 may determine if the available aggregate bandwidth is sufficient to communicate the committed information rate for all classes. If sufficient bandwidth is not available, traffic manager may shape traffic for each class of traffic to allow traffic for each such class in proportion to the available aggregate bandwidth in scenarios. For example, traffic manager 106 may allow traffic at a rate equal to the product of the available aggregate bandwidth and the respective committed information rate for the particular class divided by the aggregate committed information rate for all classes.

FIG. 3 illustrates a flow chart for an example method 300 for dynamic rate limiting and shaping based on variable bandwidth, in accordance with embodiments of the present disclosure. According to some embodiments, method 300 may begin at step 302. As noted above, teachings of the present disclosure may be implemented in a variety of configurations of network 10 and/or network element 102. As such, the preferred initialization point for method 300 and the order of the steps 302-310 comprising method 300 may depend on the implementation chosen.

At step 302, a datagram framer (e.g., datagram framer 108) of a network element (e.g., network element 102) may monitor available aggregate bandwidth of the network element. At step 304, the datagram framer may communicate information regarding the available aggregate bandwidth to a traffic manager (e.g., traffic manager 106) of the network element.

At step 306, the traffic manager may determine if the available aggregate bandwidth is sufficient to communicate the committed information rate for all classes. For example, if the available aggregate bandwidth is less than the aggregate total of the committed information rate for all classes, then bandwidth is insufficient to communicate the committed information rate for all classes. If bandwidth is sufficient to communicate the committed information rate for all classes, method 300 may proceed to step 308. Otherwise, if bandwidth is insufficient to communicate the committed information rate for all classes, method 300 may proceed to step 310.

At step 308, in response to a determination that bandwidth is sufficient to communicate the committed information rate for all classes, the traffic manager may shape traffic for all classes in accordance with the committed information rate for each class. After completion of step 308, method 300 may proceed again to step 302.

At step 310, in response to a determination that bandwidth is insufficient to communicate the committed information rate for all classes, the traffic manager may shape traffic for all classes such that traffic in all classes is allowed, but for each class at a rate lower than the committed information rate. For example, the traffic manager may allow traffic in each class in an amount proportional to the available aggregate bandwidth and its committed information rate. After completion of step 308, method 300 may proceed again to step 302.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order. Method 300 or steps similar to method 300 may be applied to either of an increase or a decrease in aggregate available bandwidth.

Method 300 may be implemented using network element 102 or any other system operable to implement method 300. In certain embodiments, method 300 may be implemented partially or fully in software and/or firmware embodied in a memory or other computer-readable media and executable by a processor or other suitable device (e.g. processor 103).

A component of network 10 and/or a network element 102 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 and/or a network element 102 without departing from the scope of the invention. The components of network 10 and/or network element 102 may be integrated or separated. Moreover, the operations of network 10 and/or network element 102 may be performed by more, fewer, or other components. Additionally, operations of network 10 and/or a network element 102 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, comprising:
    monitoring available aggregate bandwidth of a network element;
    determining if the available aggregate bandwidth is sufficient to communicate traffic at a rate equal to an aggregate sum of committed information rates for a plurality of classes of traffic;
    in response to a determination that the available aggregate bandwidth is sufficient to communicate traffic at the rate equal to the aggregate sum of committed information rates for a plurality of classes of traffic, communicating traffic for each of the plurality of classes in accordance with the respective committed information rate for each class; and
    in response to a determination that the available aggregate bandwidth is insufficient to communicate traffic at the rate equal to the aggregate sum of committed information rates for a plurality of classes of traffic, communicating traffic for each of the plurality of classes in an amount proportional to the respective committed information rate for a particular class and the available aggregate bandwidth.

2. A method according to claim 1, wherein communicating traffic for each of the plurality of classes in an amount proportional to the respective committed information rate for a particular class and the available aggregate bandwidth comprises communicating traffic at a rate equal to the product of the available aggregate bandwidth and the respective committed information rate for the particular class divided by the aggregate committed information rate for all classes.

3. A method according to claim 1, wherein monitoring available aggregate bandwidth of a network element comprises monitoring available aggregate bandwidth of a Link Capacity Adjustment Scheme Group.

4. A method according to claim 1, wherein monitoring available aggregate bandwidth of a network element is performed by a datagram framer.

5. A method according to claim 4, wherein the datagram framer is a synchronous optical networking framer.

6. A method according to claim 1, further comprising determining, by a traffic manager, the rate of data to be communicated for each particular class.

7. A network element comprising:
- a datagram framer configured to monitor available aggregate bandwidth of a network element;
- a traffic manager configured to:
  - receive information from the datagram framer regarding the available aggregate bandwidth;
  - determine if the available aggregate bandwidth is sufficient to communicate traffic at a rate equal to an aggregate sum of committed information rates for a plurality of classes of traffic;
  - in response to a determination that the available aggregate bandwidth is sufficient to communicate traffic at the rate equal to the aggregate sum of committed information rates for a plurality of classes of traffic, allow traffic for each of the plurality of classes at an allowed rate approximately equal to the respective committed information rate for each class; and
  - in response to a determination that the available aggregate bandwidth is insufficient to communicate traffic at the rate equal to the aggregate sum of committed information rates for a plurality of classes of traffic, allow traffic for each of the plurality of classes at an allowed rate proportional to the respective committed information rate for a particular class and the available aggregate bandwidth; and
- the datagram framer further configured to communicate traffic for each class at the respective the respective allowed rate of traffic.

8. A network element according to claim 7, the traffic manager further configured to allow traffic for each of the plurality of classes at an allowed rate proportional to the respective committed information rate for a particular class and the available aggregate bandwidth by allowing traffic for each particular class at a rate equal to the product of the available aggregate bandwidth and the respective committed information rate for the particular class divided by the aggregate committed information rate for all classes.

9. A network element according with claim 7, the datagram further configured to monitor available aggregate bandwidth of the network by monitoring available aggregate bandwidth of a Link Capacity Adjustment Scheme Group.

10. A network element according to claim 7, wherein the datagram framer is a synchronous optical networking framer.

11. A non-transitory computer-readable medium comprising logic that is operable, when executed, to:
- monitor available aggregate bandwidth of a network element;
- determine if the available aggregate bandwidth is sufficient to communicate traffic at a rate equal to an aggregate sum of committed information rates for a plurality of classes of traffic;
- in response to a determination that the available aggregate bandwidth is sufficient to communicate traffic at the rate equal to the aggregate sum of committed information rates for a plurality of classes of traffic, communicate traffic for each of the plurality of classes in accordance with the respective committed information rate for each class; and
- in response to a determination that the available aggregate bandwidth is insufficient to communicate traffic at the rate equal to the aggregate sum of committed information rates for a plurality of classes of traffic, communicate traffic for each of the plurality of classes in an amount proportional to the respective committed information rate for a particular class and the available aggregate bandwidth.

12. A non-transitory computer-readable medium according to claim 11, wherein communicating traffic for each of the plurality of classes in an amount proportional to the respective committed information rate for a particular class and the available aggregate bandwidth comprises communicating traffic at a rate equal to the product of the available aggregate bandwidth and the respective committed information rate for the particular class divided by the aggregate committed information rate for all classes.

13. A non-transitory computer-readable medium according to claim 11, wherein monitoring available aggregate bandwidth of a network element comprises monitoring available aggregate bandwidth of a Link Capacity Adjustment Scheme Group.

* * * * *